United States Patent
Brookins et al.

(10) Patent No.: US 9,426,180 B2
(45) Date of Patent: Aug. 23, 2016

(54) SECURITY POLICY EDITOR (71) Applicant: Akamai Technologies, Inc., Cambridge, MA (US)

(72) Inventors: Nicholas S. Brookins, San Diego, CA (US); Akinwale O. Olugbile, San Diego, CA (US); James A. Mutton, Maple Valley, WA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 13/723,929

(22) Filed: Dec. 21, 2012

(65) Prior Publication Data

US 2013/0167193 A1 Jun. 27, 2013

Related U.S. Application Data (60) Provisional application No. 61/578,724, filed on Dec. 21, 2011.

(51) Int. Cl.
*H04L 29/06* (2006.01)
*H04L 29/08* (2006.01)

(52) U.S. Cl.
CPC .............. *H04L 63/20* (2013.01); *H04L 63/10* (2013.01); *H04L 63/205* (2013.01); *H04L 67/20* (2013.01)

(58) Field of Classification Search
CPC ..... H04L 63/20; H04L 63/10; H04L 63/205; H04L 67/20; G04F 21/53
USPC ............................................................ 726/1
See application file for complete search history.

(56) References Cited

U.S. PATENT DOCUMENTS

| | | | | |
|---|---|---|---|---|
| 7,376,719 B1* | 5/2008 | Shafer | ................... | H04L 41/082 709/203 |
| 7,555,769 B1* | 6/2009 | Shapiro | ................. | G06F 21/604 715/700 |
| 7,725,658 B2* | 5/2010 | Lang | .................... | G06F 12/0862 600/300 |
| 8,086,750 B2* | 12/2011 | Voegel | .............. | G06F 17/30867 709/226 |
| 8,238,891 B1* | 8/2012 | Tam | ..................... | H04M 3/4878 455/418 |
| 8,413,256 B2* | 4/2013 | Gonzalez | ................ | G06F 21/10 726/27 |
| 8,443,185 B2* | 5/2013 | Maller | ................... | G06Q 10/10 713/152 |

(Continued)

*Primary Examiner* — Linglan Edwards
(74) *Attorney, Agent, or Firm* — David H. Judson (57) ABSTRACT

A shared computing infrastructure has associated therewith a portal application through which users access the infrastructure and provision one or more services, such as content storage and delivery. The portal comprises a security policy editor, a web-based configuration tool that is intended for use by customers to generate and apply security policies to their media content. The security policy editor provides the user the ability to create and manage security policies, to assign policies so created to desired media content and/or player components, and to view information regarding all of the customer's current policy assignments. The editor provides a unified interface to configure all media security services that are available to the CDN customer from a single interface, and to enable the configured security features to be promptly propagated and enforced throughout the overlay network infrastructure. The editor advantageously enables security features to be configured independently of a delivery configuration.

16 Claims, 10 Drawing Sheets

(56) References Cited

U.S. PATENT DOCUMENTS

| | | | |
|---|---|---|---|
| 8,521,813 B2* | 8/2013 | Black | H04L 67/16 709/203 |
| 8,724,805 B2* | 5/2014 | Moon | H04L 9/088 380/200 |
| 8,787,581 B2* | 7/2014 | Maller | G06Q 30/02 380/285 |
| 2002/0093527 A1* | 7/2002 | Sherlock | H04L 12/2602 715/736 |
| 2006/0075465 A1* | 4/2006 | Ramanathan et al. | 726/1 |
| 2009/0150518 A1* | 6/2009 | Lewin et al. | 709/219 |
| 2011/0302241 A1* | 12/2011 | Gohda | G06F 17/30902 709/203 |
| 2012/0197772 A1* | 8/2012 | Hing | G06Q 30/04 705/34 |
| 2012/0198070 A1* | 8/2012 | Black et al. | 709/226 |

\* cited by examiner

| Security Policies | Policy Assignment |

Staging ▼

Configuration: realspe.xml ▼

Path/URL wildcard: /z/../videos/*   Show Path Guidelines
Security Policy: Allow All (Preset) ▼

☑ Start Date/Time  03/29/2012  12:00 AM ▼
Thursday

☑ End Date/Time  05/30/2012  12:00 AM ▼
Wednesday

Note: Only policies that have been zone tested are available for assignments.   [Add]

Digital Properties
Configuration is not yet activated.

| Path | Policy | Date | Actions |
|---|---|---|---|
| /* | AEG_VOD | 02/23/2012 12:00 AM - 02/29/2012 12:00 AM | Remove |
| /... | Allow All (Preset) | 11/19/2011 12:00 AM - * | Remove |

[Cancel] [Save]

FIG. 5

| | | | | |
|---|---|---|---|---|
| Summary | Token Auth | Content Targeting | Media Encryption | Player Verification |

Policy Name: [ ]

Description: [ ]

Feature Summary:

Note: Table data is not updated until policy is saved.

| Feature | Enabled | ▲ Summary |
|---|---|---|
| Media Encryption | false | Percent: 100 |
| Token Auth | false | Enforce on Initial Request and Content Requests |
| Content Targeting | false | Geo Protection: Disabled<br>IP Access Lists: Disabled<br>Referrer Check: Disabled |
| Player Verification | false | Approved players: 0 Enabled: 0 TTL: N/A |

Associated HD Network Configurations:

| Config Name | Type ▲ |
|---|---|
| No records found. | |

[ Cancel ] [ Save ]

FIG. 6

| Summary | Token Auth | Content Targeting | Media Encryption | Player Verification |

☐ Enable Token Auth

Active Password [            ]  [Generate Active Password]  [32] char long

Transition Password [            ]  [Cycle Password]

Note: The inputs above should be in Hexadecimal values [0-9a-f].

Segmented Content Options
- ☑ Enforce URL token for initial request
- ☑ Use cookie tokens to protect content/segment request

[Cancel] [Save]

FIG. 7

☐ Enable GeoProtection

Location Type

[Countries ▼]  [Select Country ▼]

Available Locations

[Deny from these locations ▼]

Afghanistan
Albania
Algeria
American Samoa
Andorra

Override GEO blocking for these IPs/CIDR blocks:

Note: These IP Addresses will be allowed even if they belong to one of the blocked geographies.

☐ Redirect on deny [            ]

FIG. 8

☐ Enable IP Access Lists

Add IP Address/CIDR blocks             Deny these IPs ▼

☐ Redirect on deny

FIG. 9

☐ Enable Referrer Checking

Note: SecureHD uses non-strict Referring checking, which means that requests with no Referrer header will not trigger a Referring checking failure. Please refer to the documentation for more information.

Add Domain(s)                          Allowed Domain(s)

☐ Redirect on deny

| Summary | Token Auth | Content Targeting | Media Encryption | Player Verification |

Export to CSV

☑ Enable Player Verification

☑ Enable Support Player Bypass *(Used to temporarily allow Akamai Test Players. Valid for 24 hours)*

Email ID: [      ]  *(Used to notify if support player bypass permission expires.)*

Approved Players:

| Enable | ID | Description | Date Added | Actions ▲ |
|--------|-----|-------------|------------|-----------|
| ☑ | 322 | test<br>Player HASH:<br>c4a1e9a15fe2cc61ebf6<br>3f3f7a511f9c01980921<br>34fb5e19c58b68d27766<br>2cd1 | 01-07-2012 08:15pm | Remove |

─ Add approved player ─

⦿ Upload Player  [                    ]  [ Browse... ]

Description  [                    ]

⦿ Add Hashes  [                                        ]

Accepted in csv format. One player per line:
[player hash], [description], [enabled].
Valid values for [enabled] are 0,1,true,false,enabled,disabled.
Example:
HASH, Some Description, true
HASH, Some Description, 0

[ Upload ]

SECURITY POLICY EDITOR

This application is based on and claims priority to Ser. No. 61/578,724, filed Dec. 21, 2011.

This application also contains subject matter that is protected by copyright.

BACKGROUND OF THE INVENTION

1. Technical Field

This application relates generally to management of content in a shared infrastructure.

2. Brief Description of the Related Art

Distributed computer systems are well-known in the prior art. One such distributed computer system is an overlay network that is operated and managed by a service provider. A commercial overlay network is sometimes referred to as a "content delivery network" or CDN. The service provider typically provides the content delivery service on behalf of third parties (customers) who use the service provider's infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

While content delivery networks such as described above provide significant advantages, typically they include dedicated platforms to support delivery of content for multiple third party runtime environments that are, in turn, based on their own proprietary technologies, media servers, and protocols. These distinct platforms are costly to implement and to maintain, especially globally and at scale as the number of end users increases. Moreover, at the same time, content providers (such as large-scale broadcasters, film distributors, and the like) desire their content to be delivered online in a manner that complements traditional mediums such as broadcast TV (including high definition or "HD" television) and DVD. This content may also be provided at different bit rates. End users also desire to interact with the content as they can do now with traditional DVR-based content delivered over satellite or cable. A further complication is that Internet-based content delivery is no longer limited to fixed line environments such as the desktop, as more and more end users now use mobile devices such as the Apple® iPhone® to receive and view content over mobile environments.

It is also known to provide an integrated content delivery network platform with the ability to deliver online content (such as HD-quality video) at broadcast audience scale to the most popular runtime environments (such as Adobe® Flash®, Microsoft® Silveright®, etc.) as well as to mobile devices such as the iPhone to match what viewers expect from traditional broadcast TV. The techniques described in U.S. Publication No. 2011/0296048, the disclosure of which is incorporated herein by reference, address this problem. The approach described there provides an integrated HTTP-based delivery platform that provides for the delivery online of HD-video quality content to the most popular runtime environments and to the latest devices in both fixed line and mobile environments. The platform supports delivery of both "live" and "on-demand" content. The techniques described therein are sometimes referred to herein as the HD Network™.

As noted above, a content delivery network such as described above typically includes a customer portal. The customer portal is typically web-based and configured as an extranet configuration application by which users authorized by a CDN customer access and provision their services. One such service is the storage and delivery of digitized files, software, video, or other large objects. Customers who use the CDN shared infrastructure for this purpose typically require the ability to manage their content files. As used herein, file management typically refers to the ability to list, move, delete and upload files, as well as to create and remove directories in which the customer's content is stored. A CDN portal application (the "portal") typically is implemented as a distributed, secure application comprising a web server-based front-end, one or more application servers, one or more database servers, a database, and other security, administrative and management components.

With the skyrocketing popularity of online audio and video, content publishers have an extraordinary opportunity to leverage the compelling, interactive medium that the Internet offers to reach greater audiences and explore new business models. Because content piracy fundamentally threatens the content provider's ability to monetize valuable assets, it must protect its content from unauthorized use and redistribution. Beyond the requirements of the provider's own business model, the provider may be further tasked with the challenge of enforcing security and access control restrictions driven by outside content rights holders.

Securing media assets is a complex issue, one that requires a defense-in-depth approach that employs different techniques to defend against different threats. In addition, content protection solutions need to strike the right balance between business and legal requirements, end user experience, and cost.

There is a need for a simple-to-use, web-based interface that enables configuration and application of various security services for media content that is adapted to be delivered over a third party infrastructure.

BRIEF SUMMARY

A shared computing infrastructure has associated therewith a storage system, and a portal application through which portal users access the shared computing infrastructure and provision one or more services, such as content storage and delivery. A representative shared computing infrastructure is a content delivery network (CDN). According to this disclosure, the infrastructure includes a portal that comprises a security policy editor, a web-based configuration tool that is intended for use by customers to generate and apply security policies to their media content. The security policy editor provides the user (e.g., a CDN customer administrator) the ability to create and manage security policies, to assign policies so created to desired media content and/or player components, and to view information regarding all of the customer's current policy assignments. The editor provides a unified interface to configure all media security services that are available to the CDN customer from a single interface, and to enable the configured security features to be promptly propagated and enforced throughout the overlay network infrastructure. The editor advantageously enables security features to be configured independently of a delivery configuration. This approach ensures that security policies are applied in a consistent manner across all delivery formats being utilized by the customer.

To that end, and according to another aspect of this disclosure, security policy enforcement uses a bifurcated approach. In particular, the basic logic that is used to enforce a security feature (e.g., how to enforce a geo-targeting restriction, how to check an authentication token, or the like depending on the feature) is encoded in (relatively) slow-changing metadata that is common to some (or even all) CDN customers. That metadata is provided to servers within the CDN at which policy decisions are enforced. On the other hand, the actual details of a customer's security policy (e.g., the list of countries against which the geo-targeting restriction is to be applied, a salt to be used to check the authentication token, product enablement data, etc., depending on the feature) are stored separately and stitched back into the underlying enforcement logic at runtime (i.e., at the time the security policy needs to be enforced with respect to a particular resource request). The security policy and its associated parameters are customer-specific and may be (relatively) fast-changing (as compared to the underlying logic, which is more static). In one embodiment, the security policy and parameters are encoded as an edge-side-include (ESI) fragment that is retrieved and executed in an edge server to enforce a security policy. In an alternative embodiment, the security policy and parameters are stored as a pre-compiled decision tree and retrievable from a secure, scalable database.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 6 illustrates a representative token authentication tab in the editor;

FIG. 7 illustrates a representative content targeting tab in the editor;

DETAILED DESCRIPTION

Figure 1:
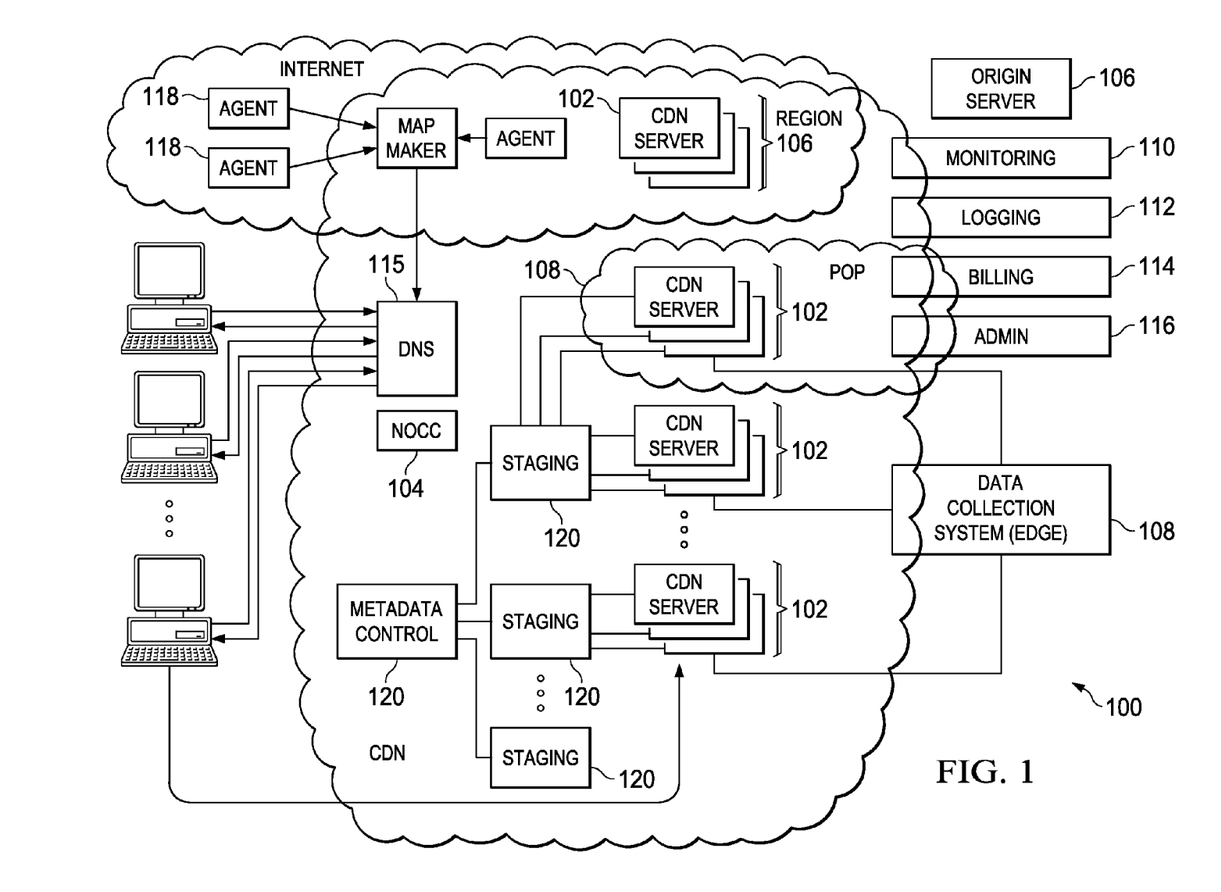
FIG. 1 is a block diagram illustrating a known distributed computer system configured as a content delivery network (CDN)

FIG. 1 illustrates a known distributed computer system (a shared infrastructure) for storage of and delivery of content (digitized files) on behalf of customers of that shared infrastructure. As will be described herein, the shared infrastructure includes a security policy editor solution (referred to as the "Security Policy Editor (SPE)") that enables security features to he configured independently of delivery options associated with the delivery of content from the shared infrastructure in multiple output formats. The security policy editor enables configuration of security settings (policies) that are then made available (enforced) across all network configurations, regardless of format.

As used herein, a "policy" (or a "security policy") is a collection of values that control the enforcement of a security feature service provided by the overlay network (or other cloud-based) service provider. A "configuration" refers to a customer's configuration for a particular delivery product/service. A "pre-configured value selection" (PVS) refers to the concept of grouping one or more values into a pre-configured policy that can he validated and applied across the overlay network infrastructure reliably and quickly. With the PVS approach, and as will be described, changes to any part of a security configuration can be updated independently of the configurations that reference it.

By way of background, in a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
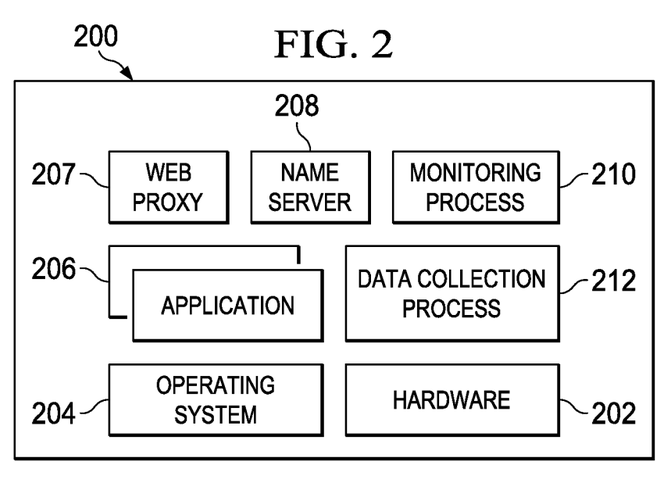
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine also may include one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

An edge server typically includes an edge-side-include (ESI) mechanism, such as described in U.S. Pat. No. 7,752,258. ESI is a simple markup language used to define the business logic for how Web page components are dynamically assembled and delivered from the edge of the Internet. In the CDN context, ESI is used to provide a way for a content provider to express the business logic of how a CDN provider should assemble the content provider's pages. More generally, it provides a mechanism for assembling dynamic content transparently across application server solutions, content management systems and other networks. It enables a content provider to develop a Web application once and choose at deployment time where the application should be assembled, e.g., on a content management system, an application server, or the CDN, thus reducing complexity, development time and deployment costs. The ESI inclusion function enables the retrieval and including of files that comprise a web page, with each file subject to its own configuration and control, namely, cacheability properties, refresh properties, and so forth.

The CDN includes or has associated therewith a storage subsystem, such as described in U.S. Pat. No. 7,472,178, the disclosure of which is incorporated herein by reference. A representative storage site in this context is a collection of one of more storage "regions," typically in one physical location. In this subsystem, preferably content (e.g., a customer's digital files) is replicated across storage sites.

The CDN also may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

As noted above, the CDN service provider provides a secure customer portal that is web-based and configured as an extranet configuration application. The portal is the usual way in which users authorized by a CDN customer access and provision their services. One such service is the storage and delivery of digitized files, software, video, or other large objects. Customers who use the CDN shared infrastructure for this purpose typically require the ability to manage their content files. As used herein, and as noted above, file management typically refers to the ability to list, move, delete and upload files, as well as to create and remove directories in which the customer's content is stored. A CDN portal application (the "portal") typically executes on one or more machines, wherein a machine comprises hardware (CPU, disk, memory, network interfaces, other I/O), operating system software, applications and utilities. The portal typically is implemented as a distributed, secure application comprising a web server-based front-end, one or more application servers, one or more database servers, a database, and other security, administrative and management components.

An edge server process may need to contact an intermediate server to retrieve user information before going forward to an origin server. An intermediate processing agent (IPA) may be used for this purpose. An IPA request is an internal (within the CDN) request having a response that may be cacheable. Control over the IPA function may be implemented in edge server metadata.

For purposes of this disclosure, it is assumed that the CDN (or other cloud-based provider) provides an integrated HTTP-based delivery platform that provides for the delivery online of HD-video and audio quality content to popular runtime environments operating on multiple types of client devices in both fixed line and mobile environments. The content is available in multiple formats.

Security Policy Editor

With the above as background, the subject matter of this disclosure is now described.

As described herein, the security policy editor application provides a streamlined, easy-to-use, web-based interface to the CDN for CDN customers. As noted above, the security policy editor enables an authenticated and authorized user (associated with a CDN customer) to create a policy and configure one or more security services, and then apply the policy to content to protect it.

For purposes of illustration only, it is assumed that the service provider provides a suite of security services such as, without limitation, token authorization (which is used to authorize an end user and prevent link sharing and/or media player hijacking), content targeting (which enables selection of client IP addresses and/or domains to limit access to content), media encryption (which enables delivery of content in an encrypted format to the media player runtime), player verification (which enables validation of a media player against a list of approved players to detect player tampering and prevent deep linking attacks, and the like. According to this disclosure, SPE is used to create a policy comprised of one or more of such protection services that are then applied to a configuration of media. This configuration may be generated using any convenient media provisioning tool or application.

According to another aspect of this disclosure, security policy enforcement uses a bifurcated approach. In particular, preferably the basic logic that is used to enforce a security feature is encoded in (relatively) slow-changing metadata that is common to some (or even all) CDN customers. That metadata is provided to servers within the CDN at which policy decisions are enforced. On the other hand, the actual details of a customer's security policy are stored separately and stitched back into the underlying enforcement logic at runtime (i.e., at the time the security policy needs to be enforced with respect to a particular resource request). The security policy and its associated parameters are customer-specific (or even more fine-grained) and may be (relatively) fast-changing (as compared to the underlying logic, which is more static). A customer may have many of security policies, and each such security policy may be as fine-grained as desired. In one embodiment, as will be described below, the security policy and parameters are encoded as an edge-side-include (ESI) fragment that is retrieved and executed in an edge server to enforce a security policy. In an alternative embodiment, the security policy and parameters are stored and retrievable from a secure, scalable data storage system.

The portal application in general and the security policy editor in particular may be implemented as a web-based interface, e.g., as a set of web pages that are available at a particular overlay network domain, together with the software functions and features described herein.

Figure 3:
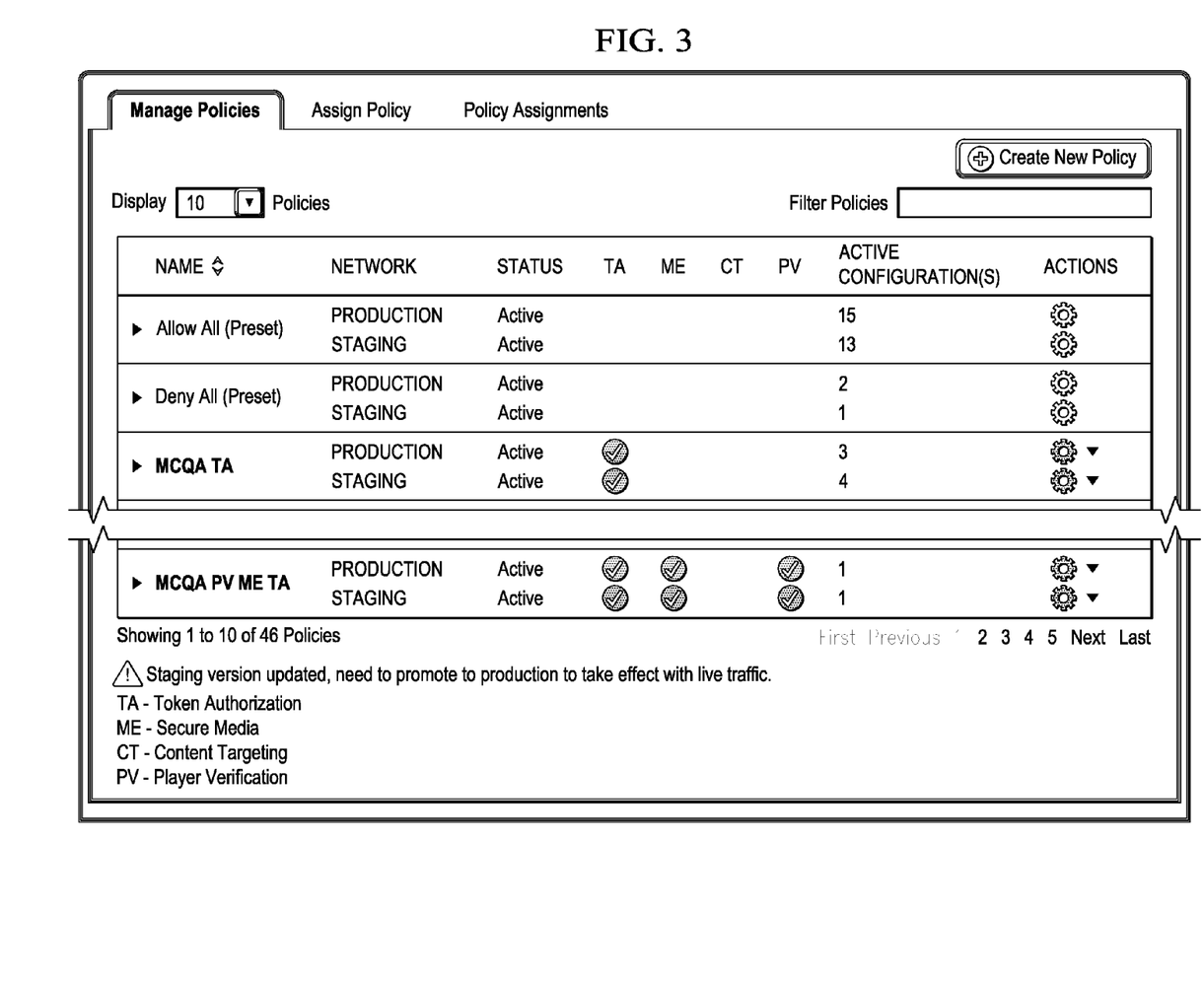
FIG. 3 illustrates a representative security policy editor interface.

The following describes additional details of the security policy editor interface and functionality. It is assumed that each individual security service available in SPE requires a specific permission for use, which provisions are established during provisioning of the customer account. Preferably, the one or more permission(s) that enable access to the one or more security services are defined in an access control file. Thus, when a permitted user associated with a customer accesses SPE, only those security services that have been provisioned for that customer are exposed to the user. Upon permitted access to the portal, the end user navigates to the UI and is presented with several display tabs (web pages), such as shown in FIG. 3. The Manage Policies tab is used to create and manage security policies. The Assign Policy tab is used to assign policies that have been created to desired media content and/or player components, in order to provide them with the security configured. The Policy Assignments tab allows the user to view information regarding all of the customer's current policy assignments.

Without intending to be limiting, the Manage Policies tab includes a number of display elements. A Display <#> Policies drop-down enables the user to select a maximum number of policies displayed per page. The Filter Policies field enables a user to input a desired Policy Name. The Name column identifies the name given to the security policy during creation. In this example, there are several policy types. An Allow All (Preset)/Deny All (Preset) Policies appear by default. They are used during generation of a media configuration. The remaining example types are Standard Policies, which refers to entries that are revealed as a single, clickable name value. These represent current, valid policies that have been created using SPE. The Network column represents available instances of a policy/configuration relationship which, in this example, are Staging and Production. These are merely representative. The Status column is the current status of each Network instance of the policy. The Enabled Features column is populated with the protections that have been configured for each Network instance of the policy, such as TA (token authentication), ME (media encryption), PV (player verification) and CT (content targeting). Entries revealed with check marks indicate that this protection has been enabled in the policy. The Active Configuration(s) column includes values that represent the number of active configurations to which the policy has been assigned/promoted (i.e., based on the Network instance of the policy). The Actions column offers a gear icon for Network instance of the policy. When clicked, a menu of options is revealed that can be used to interact with the policy (based on the Network instance). Thus, for a Production network, the user can select an option to edit a staging instance of the policy, clone a production instance of the policy, view historical data pertaining to the production instance of the policy, delete the policy, and the like. For a Staging network, the user can select an option to edit the policy, or to promote a policy/configuration relationship from the staging network to the production network.

As noted above, the above-described security services (e.g., TA, ME, PV and CT) are not intended to be limiting. Other security services include, without limitation, digital watermarking, digital rights management, fraud detection, and other analytics services related to security and firewall services.

Thus, FIG. 3, the initial SPE screen, shows a list of policies and summary data.

Preferably, a media configuration file consisting of desired media content/players is generated and available to the system. Once generated, the configuration as defined is saved (e.g., as an individual XML file) that is available for selection in the SPE UI when performing policy creation.

Figure 4:
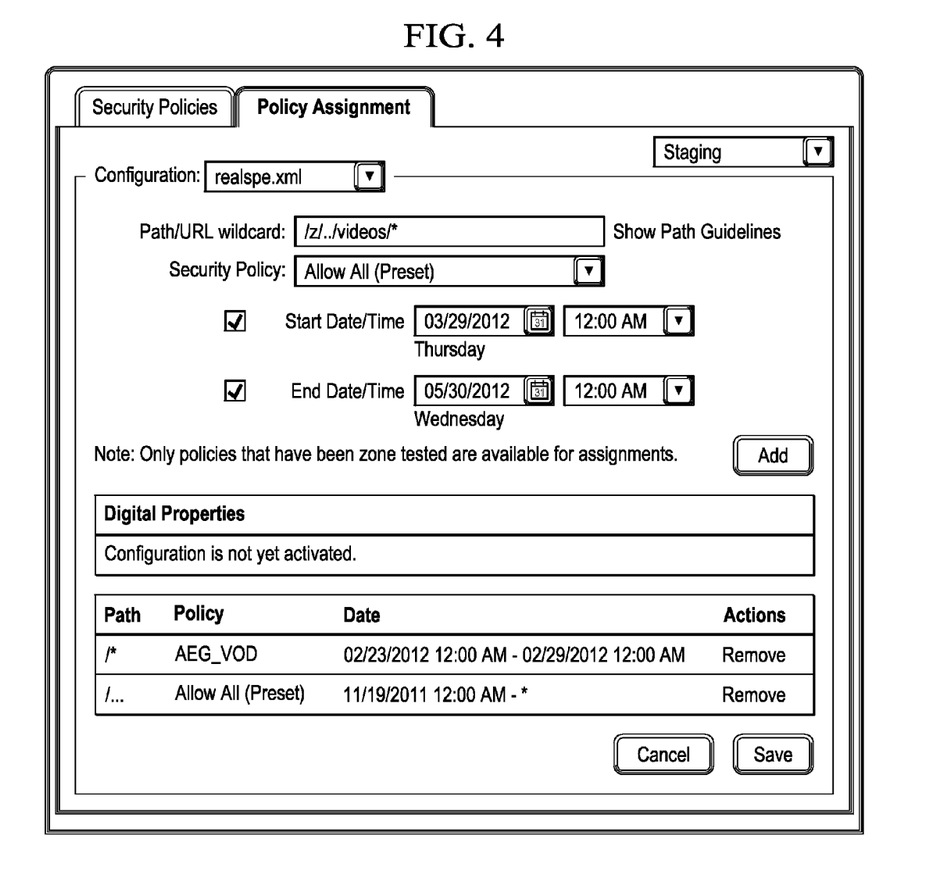
FIG. 4 illustrates a display tab in the security policy editor interface for policy assignment.

The Policy Assignment process is implemented using the Assign Policy tab. The user selects either Staging or Production (e.g., using a radio button), which navigates the user to a Policy Assignment tab as shown in FIG. 4. By default, Staging is a required setting when applying a new policy to a configuration. In particular, preferably a policy/configuration relationship must first exist in the Staging network (e.g., for testing/verification purposes) prior to being promoted to the Production network. When the Production value selected, all options in the tab except the Configuration drop-down are hidden. This allows the user to select a specific configuration and view the security policies that are currently associated with it (e.g., for review purposes). From the Configuration drop-down, the user can select the appropriate configuration. In the Path/URL Wildcard field, the user can input a path value that points to the content in the selected configuration that is to be protected by the policy. Based on content format, wildcards may be supported. The Security Policy drop-down is used to select the appropriate policy. If desired, the user can set a range of time for which the policy will be valid, using the Start/End Date/Time functionality. The user can click an Add Path button to assign the policy. The defined path (that the policy targets) is then displayed in the table at the bottom of the tab. The above-described steps are repeated to assign additional policies. Using the interface, the user can protect a different path of content with the same policy, protect the same path of content with a different policy (e.g., at a later date), or the like. When the desired polices are assigned, the user selects the Save button. As a result, the association between the policy and the configuration exists in the Staging network and can be tested and/or verified. When the association is ready to be implemented in the Production network, it is promoted by being assigned to the Production network.

As will be described in more detail below, the output of this process is an ESI fragment (or secure database entry) that maps a configuration to the policy. At runtime, this information is then stitched to appropriate security feature logic (defined in edge server metadata) to enforce a policy decision. That process is described below.

Although not a limitation, when using the functionality in this tab to assign policies, SPE may enforce certain precedence rules in the event that multiple policies target the same content, or Start/End Time range conflicts. Preferably, protections take effect by most specific and do not merge. Thus, if the user assigns a policy to a folder that utilizes ME, and then assigns a policy that does not use ME to an individual file in that folder, the policy set for the file will take precedence. Also, preferably time-based assignments take precedence over those that do not incorporate a range. Also, preferably date/time assignment overlaps may be handled as follows. Preferably, duplicate paths cannot exist within the same time period. Thus, for example, once the user inputs a specific Path/URL Wildcard and applied a Start/End Date/Time range, that same path cannot be applied within that same time period. Also, according to this precedence rule, End Date/Time is not inclusive. Thus, the end user can set two different Start/End Date/Time ranges of protection for the same path of content (e.g., to protect the same path of content with two different security policies over two different ranges of time.

Once a policy is created or edited, a user can navigate to a summary page that shows the basic high level settings and the configurations to which the policy is tied. The summary screen is shown (in a default setting) in FIG. 5.

Figure 5:
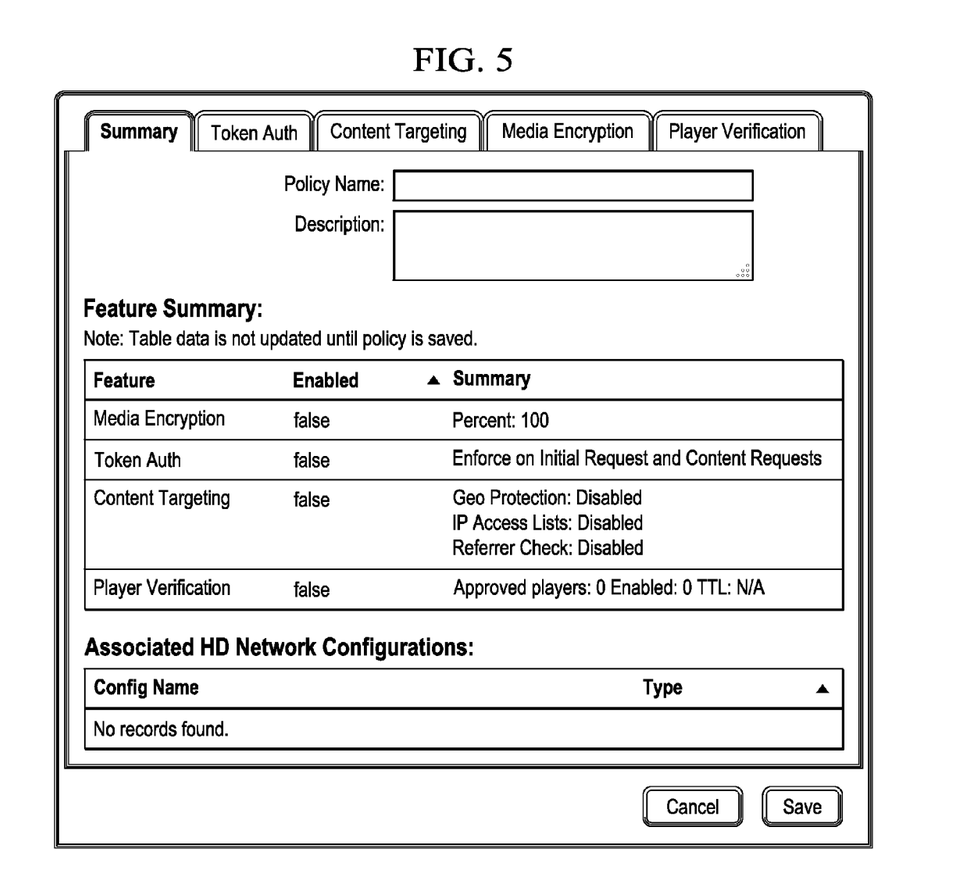
FIG. 5 illustrates a representative summary tab in the security policy editor.

As seen in FIG. 5, the SPE provides individual configuration tabs for each of the security services that are enabled for the account.

FIG. 6 illustrates a representative token authentication tab. Using the tab, the user can Enable Token Auth (to enforce this security in the policy), and set an Active Password that will be used for validation (i.e., the "trusted shared secret" used as the "key" in an HMAC, when generating the token). The Generate Active Password button is selected to have a valid value automatically generated for the Active Password field. The Char Long Field is used to input a value to serve as a character length for a password generated via the Generate Active Password button. A Transition Password is optional and can be used to input a different "trusted shared secret" password that may be used as a backup. The Cycle Password button can be used to have the current Active Password value copied to the Transition Password field. The Segmented Content Options are used to define how the password values established above are to be applied. Settings are stored when the Save button is selected.

Figure 8:
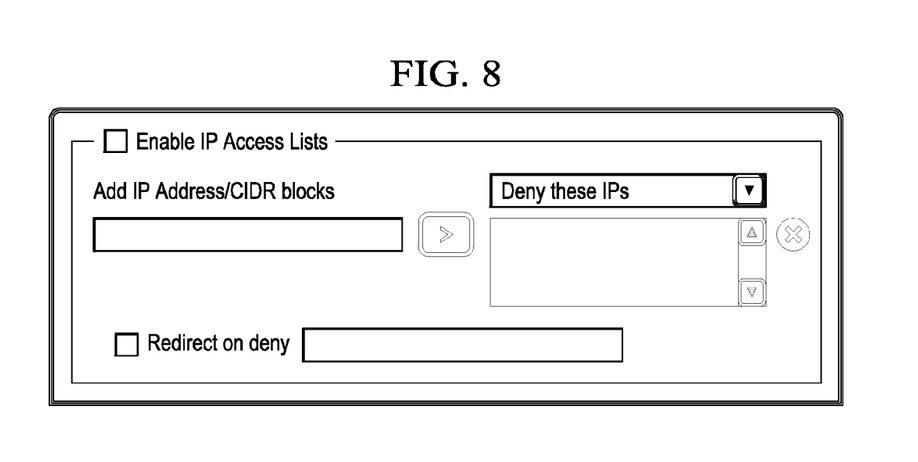
FIG. 8 illustrates an IP access list option of the content targeting tab.
Figure 9:
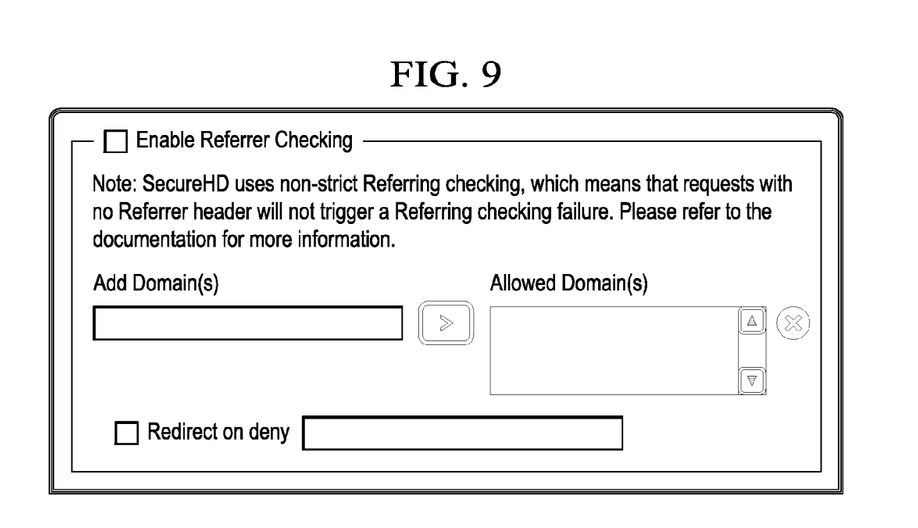
FIG. 9 illustrates a referrer checking option of the content targeting tab.

FIG. 7 illustrates a representative content targeting tab. Using the tab, the user can enable a security policy to permit/deny end users access to content, using any of several methodologies (or a combination): geographic location, specific IP address, and referrer web site. FIG. 7 illustrates the geo-location configuration tab. The function is enabled by the user selecting the Enable GeoProtection option. This enables the configuration options, such as Location Type, a drop-down list that includes Countries (Default), Regions and Locations. The Available Locations window is populated with selectable entries based on which is specified in the Location Type drop-down. Using this function, the user can define the limitation such as "Deny from these locations" or "Allow only these locations." Using additional controls, the user can "Override GEO Blocking" to override a "Deny" setting for individual IP addresses within a specified country/region. The user also can select Redirect on Deny to specify a URL of a page that serves as a "deny" destination. FIG. 8 illustrates an Enable IP Access Lists option that is available from the content targeting tab. FIG. 9 illustrates an Enable Referrer Checking functionality that is available from the content targeting tab.

Figure 10:
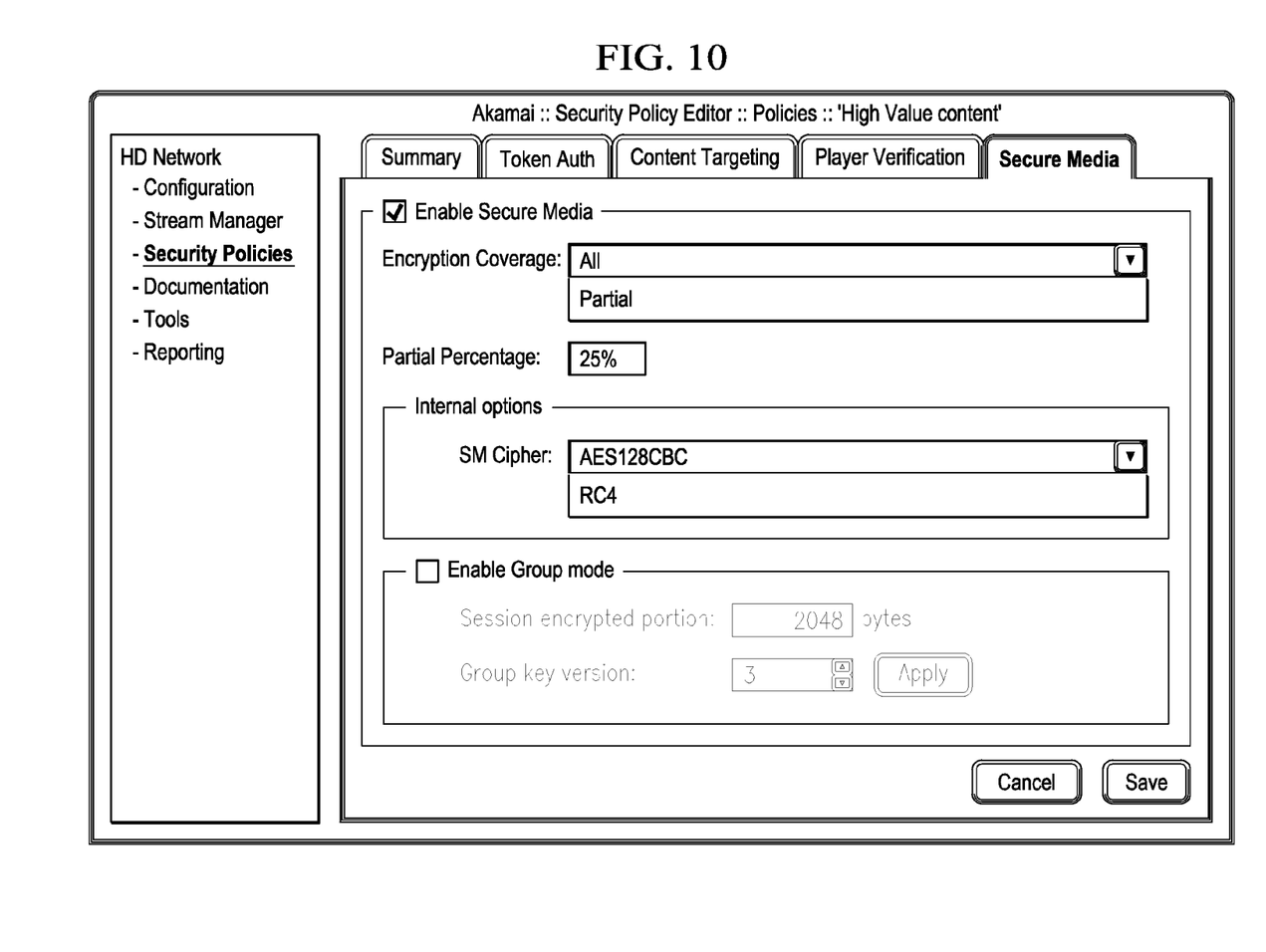
FIG. 10 illustrates a representative media encryption protection tab in the editor.

FIG. 10 illustrates a representative media encryption tab exposed in the editor. Media encryption provides security by delivering "in the network" encryption. Using this tab, the user can enable the service, specify the extent of the encryption coverage (full or partial encryption of the payload), specify the cipher (or use a default as specified), and enable a group mode (which encrypts a portion of an output with a unique session key configurable as a number of bytes, and then a remainder with a group key that is shared across users).

Figure 11:
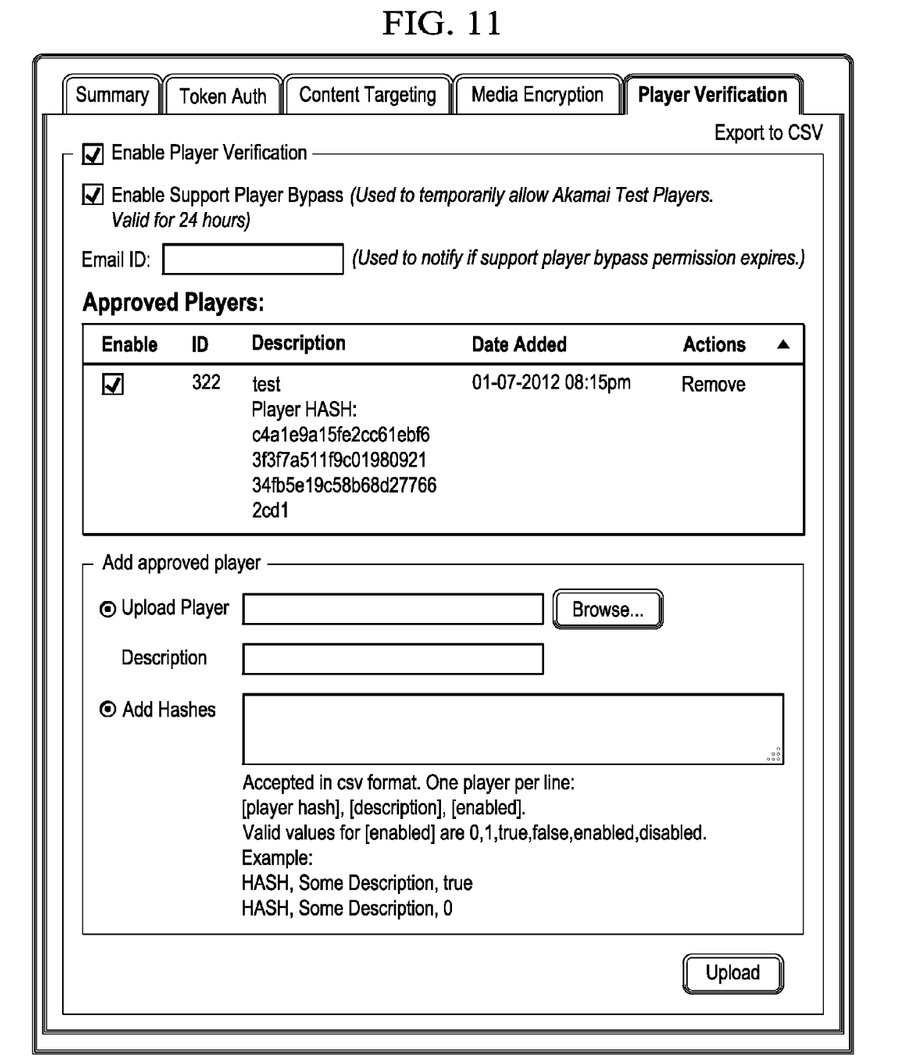
FIG. 11 illustrates a representative player verification tab in the editor.

FIG. 11 illustrates a representative player verification tab exposed in the editor. Player verification prevents unauthorized players from playing protected content. The option is selected by the user checking the Enable Player Verification checkbox. If desired, the user can click Enable Support Player Bypass to temporarily enable a test player for use in testing the security. The Approved Players frame identifies the players that have been configured. As a player is added, it is enabled by selecting a checkbox. A player may be included by calling out its hash equivalent (e.g., using a SHA-256 hash).

The above-described SPE display interfaces are not intended to be limiting. Any of the described features/options may be omitted, and others may be included depending on the security service functionality. Other configuration tabs directed to other security services may be added. Although not shown, the SPE will or may include other policy or management tabs, such as a tab to promote a newly-created policy or an edited policy, a policy history tab, a change history tab, a policy delete tab, a policy clone tab, and the like. Also, there is no requirement that separate staging and production networks be used; thus, the SPE options may adjusted accordingly.

Figure 12:
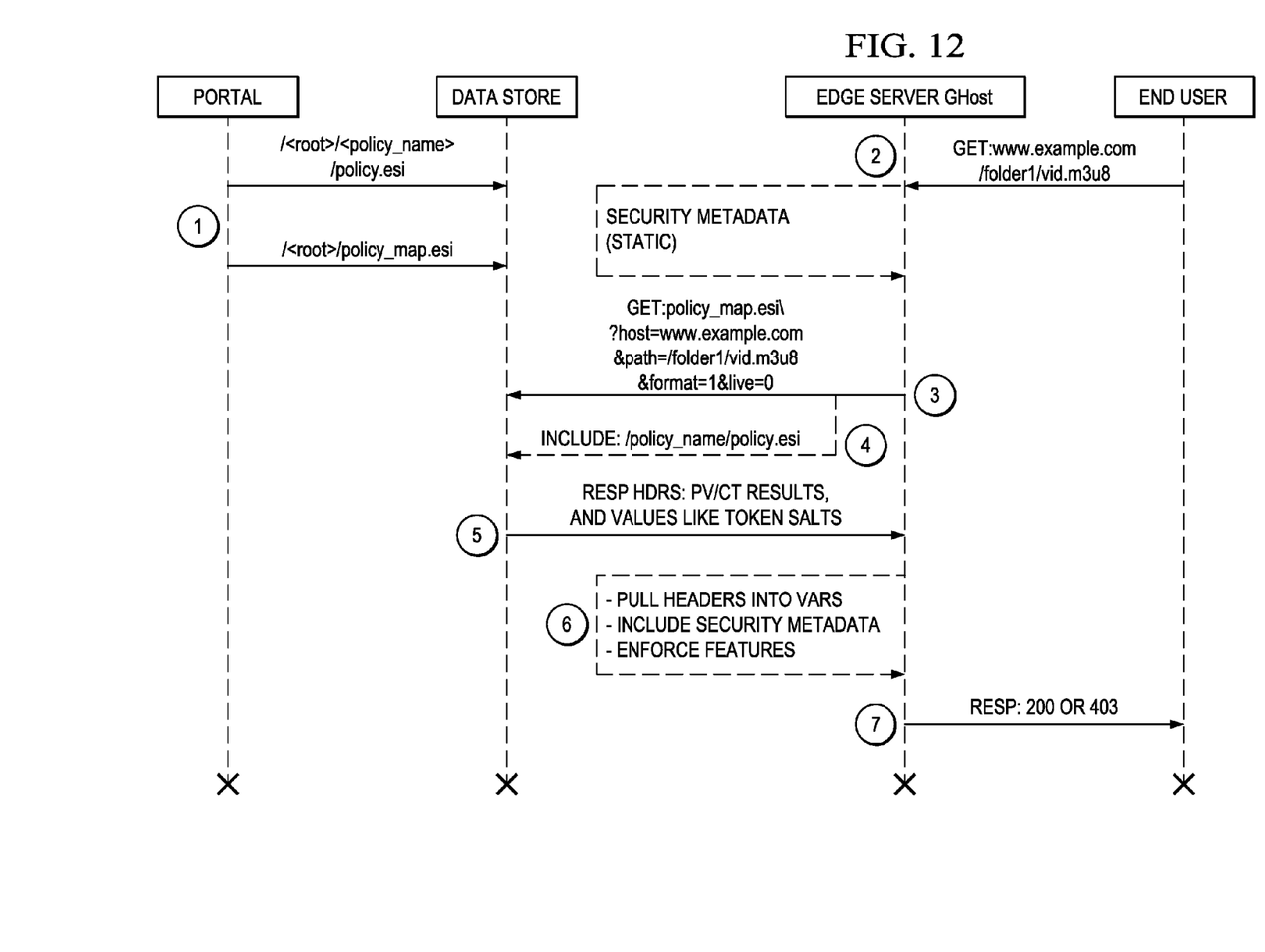
FIG. 12 illustrates a runtime request processing flow according to a first embodiment.

FIG. 12 illustrates the runtime processing of a security policy according to this disclosure. As noted above, a security policy and its associated parameters are created and saved (e.g., in a portal database). These pre-configured values are pushed to an ESI fragment (e.g., one per policy) and stored. The result is a policy.esi fragment that is later used to return these parameters to a requesting GHost process running on an edge server (and that includes an ESI mechanism). As will be described, the parameters are then used by a static snippet of edge server metadata that contains the logic for enforcing the features. Preferably, when a policy is assigned to a configuration (as has been described above), the portal stores entries in a policy_map.esi file (one per customer) that is used by the GHost process for determining the policy to use for a particular request (by hostname and path). The policy_map.esi is an ESI fragment that is one per customer and that stores the mapping assignments between policies and configurations. It accepts inputs of digital property and path, and uses these values to determine the correct policy.esi to include. The policy.esi is an ESI fragment that stores policy values, one per configured policy. The correct policy file is included by the policy_map.esi. Policies are stored in a data store, each preferably encrypted with a cacheable key stored in a key management infrastructure. Rather than directly storing values (in a data driven system like a key management infrastructure), they may be defined into variables in a small ESI fragment. When the fragment is executed in a GHost process, it simply places the parameters into response headers, which provides the GHost process a way to extract them into metadata variables; the features are then enforced in metadata in a conventional manner.

Thus, in the ESI-based embodiment, preferably only static parameters (e.g., token salt, list of countries, lists of approved player hashes, etc.) are stored in the ESI. As noted in the previous paragraph, upon request (from GHost) these values are set into response headers and plugged into metadata variables. In this bifurcated approach, preferably the logic for enforcing the security feature is coded in the security metadata, which is more static, and that is delivered to the various GHost processes (e.g., using an appropriate metadata communication channel or other means). Thus, preferably the ESI only returns headers that are used to populate variables in GHost metadata that are needed for enforcement of security. Security metadata thus is relatively slow-changing and may be maintained by the service provider. When a customer begins using the service, a snippet of security metadata (corresponding to the provisioned security feature) is added to the customer's metadata configuration (that executes at the edge server). The security metadata should remain fairly static, as (according to the bifurcated approach herein) changes to security features and versioning are done independently. With this approach, the security parameters associated with a particular security policy created through SPE populate metadata variables when the metadata is executed on the edge.

FIG. 12 illustrates this runtime request behavior for the ESI embodiment. At step (1), the policy saves the policy.esi file (one per policy). The policy_map.esi file (one per customer) is updated if changes are made to the associations of policy to delivery configuration. At step (2), and after an end user has been associated with an edge server GHost process via DNS, the end user makes a request to GHost for protected content. As has been described, access to the content is presumed to be controlled by a security service function for which security metadata has been provisioned (generally), and the security metadata details the logic for how to perform the security check required. Thus, at step (2), the metadata snippet for security enforcement is pulled. At step (3), GHost makes a request to policy_map.esi, using the appropriate query parameters for host, path, media format, and the like (included, for example, in a cache key). At step (4), the policy_map.esi determines the right policy to be used for this request, and esi: includes it. At step (5), policy.esi is executed, and it returns response headers to GHost with the configured parameters, lists, and other data associated with the security policy. The output may be cached. At step (6), the metadata sets the variables using the information from the ESI response headers, and the remainder of the security metadata template enforces the security feature (as described in the logic). Once enforced, at step (7), the request continues (HTTP 200) or fails (HTTP 403).

As shown in FIG. 12, the policy.esi and policy_map.esi fragments may be stored directly on a back-end data storage system, e.g., in a common storage group. Preferably, each customer has a unique ID assigned to them by the portal.

Thus, in the embodiment shown in FIG. 12, SPE employs a set of ESI-based policy files to near-instantly modify behavior of requests, enabling or disabling a multitude of media security features. While this approach works well, other approaches for storing and delivering (to the requesting GHost process) the policy-specific information may be utilized. In one alternative approach, virtually all policy logic is translated into a compiled form that can be executed remotely. This approach streamlines the execution path. Headers (with the relevant security policy data) are still provided to trigger behavior of predefined security metadata (as in the ESI embodiment), but there is no requirement to interpret and execute ESI on each hit. Rather, in this approach, these headers are provided by making a single (remote procedure) call to a "decider" tier (external to GHost) that executes the precompiled code and returns the headers directly. The pre-compiled decision tree (which in effect contains all matches expressed in the policy_map file) can by dynamically zoned to different edge server regions to selectively test new policy logic with specific geographic regions. Also, the footprint needed to store the pre-compiled decision tree is much smaller than that needed in the ESI approach. This alternative approach also provides operational advantages because it is relatively easy to do the zoning, loading and execution of this precompiled code in the supporting infrastructure.

The approach described herein has many advantages. When the portal (SPE) accepts user input, it can validate that the values are correctly formatted and that the parameters entered are otherwise acceptable. Meanwhile, the edge server-supported security metadata can itself be structured to validate the values returned in ESI headers prior to setting/using the variables. As noted, in this approach, the metadata (the logic behind a security feature) is fairly static so that is can be carefully constructed, tested, validated, and quality assured before being pushed out for use. Moreover, by executing the security policy at runtime in the manner described, the policy enforcement is more efficient in terms of computation and storage.

The fast changing ESI tier (or, alternatively, the pre-compiled decision tree and data store) can reach very quickly to customer changes with minimal risk, as the more complex logic (which is more susceptible to human error or integration challenges with other components) is contained in the security metadata. This architecture allows for fast iterative testing of changes, and for fast reaction to security breaches or incidents. This tier also can be used to apply additional dynamic logic as needed, for example, to vary the enforcement of features based on the geographic location of the server or end user, user-agent or other information carried with the request, or to isolate changes into dynamically-allocated zones of edge servers for safe roll-out without immediately impacting all customer traffic.

The SPE may be extended to provide additional interfaces and functionality. For example, the application may be configured to enable a user is given control to dynamically configure the execution of policies, such as the order and timing for policies to be deployed to the network. Using this feature, a user can stage the deployment of particular policies in functional or geographic zones based, for example, on characteristics of the network, or the user-agent, or the like.

In a representative implementation, the subject functionality is implemented in software, as computer program instructions executed by a processor.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTP, such as HTTPS, or any other protocol having similar operating characteristics.

There is no limitation on the type of computing entity that may implement the client-side or server-side of the connection. Any computing entity (system, machine, device, program, process, utility, or the like) may act as the client or the server.

What is claimed is as follows:

1. A method of enforcing security in a shared computing infrastructure, the computing infrastructure having associated therewith a portal application through which portal users access the shared computing infrastructure and provision one or more services, a storage system, and a set of edge servers from which protected content is delivered to requesting end users, the method comprising:

for a particular security service provided from the shared computing infrastructure structure, distributing a security metadata template to the set of edge servers, the security metadata template defining logic for performing a security operation associated with the particular security service, the logic being common to at least a set of content providers that use the shared computing infrastructure to deliver their protected content to the requesting end users;

receiving, via the portal application executing on a hardware element, information defining a security policy associated with a particular content provider, the information being specific to the particular content provider;

storing, in a data store, the information; and upon receipt at an edge server of a request for the protected content and a determination that the request includes digital property and path data that is matched for the particular content provider and the information defining the security policy, fetching the information, the information being fetched as one or more response headers over a response header interface between the data store and the edge server, stitching the information into the security metadata template by setting at least one variable defined in the security policy into the security metadata template, and thereafter executing the logic to enforce the security policy with respect to the request, wherein the information and the security metadata template remain bifurcated until receipt at the edge server of the request for the protected content.

2. The method as described in claim 1 wherein the information defining the security policy comprises customer-specific parameters received via the portal application.

3. The method as described in claim 1 wherein the information is stored as an ESI fragment.

4. The method as described in claim 3 wherein the information is stored in a pre-compiled decision tree.

5. The method as described in claim 1 wherein, as between the security metadata template and the information, the security metadata template is relatively static and the information is adapted to be updated as necessary to enforce a change to the security policy.

6. The method as described in claim 1 wherein the security service is one of: token authentication, content targeting, media encryption, media player verification, digital watermarking, digital rights management, fraud detection, and security analytics.

7. The method as described in claim 1 further including caching the information at the edge server for re-use during a given time period.

8. A system comprising a set of machines, the system comprising:

a first machine for providing a web-based application having a display interface into which is received information specifying one or more security policies associated with a security service, each security policy uniquely associated with a particular content provider, the information being specific to the particular content provider;

a data store in which the information is stored; and a second machine at which is stored a security metadata template, the security metadata template defining logic for performing a security operation associated with the security service, the logic being common to at least a set of content providers that use the system to deliver their protected content to requesting end users, wherein, upon receipt of a request to access content that is protected by a given one of the security policies and a determination that the request includes digital property and path data that is matched for the particular content provider and the information defining the security policy, the information is retrieved from the data store over a response header interface and applied by setting at least one variable defined in the security policy into the security metadata template to enforce the given security policy with respect to the request, wherein the information and the security metadata template remain bifurcated until receipt at the edge server of the request for the protected content.

9. The system as described in claim 8 wherein the security service is one of: token authentication, content targeting, media encryption, and media player verification.

10. The system as described in claim 8 wherein the information comprises customer-specific parameters received via the display interface.

11. The system as described in claim 8 wherein the information is stored as an ESI fragment.

12. The system as described in claim 8 wherein the information is stored in a pre-compiled decision tree.

13. The system as described in claim 8 wherein, as between the security metadata template and the information, the security metadata template is relatively static and the information is adapted to be updated as necessary to enforce a change to the security policy.

14. The system as described in claim 8 wherein the display interface is adapted to be used to create and manage the one more security policies.

15. The system as described in claim 8 wherein the display interface is adapted to be used to assign security policies to media content or player components.

16. The system as described in claim 8 wherein the display interface is adapted to be used to display information regarding security policy assignments.

* * * * *